(12) United States Patent
Han

(10) Patent No.: US 12,136,194 B2
(45) Date of Patent: Nov. 5, 2024

(54) METHOD AND APPARATUS FOR BONE SUPPRESSION IN X-RAY IMAGE

(71) Applicant: VIEWORKS CO., LTD., Anyang-si (KR)

(72) Inventor: Young Joo Han, Uiwang-si (KR)

(73) Assignee: VIEWORKS CO., LTD., Anyang-si (KR)

( * ) Notice: Subject to any disclaimer, the term of this patent is extended or adjusted under 35 U.S.C. 154(b) by 386 days.

(21) Appl. No.: 17/691,863

(22) Filed: Mar. 10, 2022

(65) Prior Publication Data

US 2022/0292656 A1 Sep. 15, 2022

(30) Foreign Application Priority Data

Mar. 11, 2021 (KR) .................. 10-2021-0031914

(51) Int. Cl.
| | | |
|---|---|---|
| *G06T 5/50* | (2006.01) | |
| *G06T 5/20* | (2006.01) | |
| *G06T 7/13* | (2017.01) | |
| *G06T 7/136* | (2017.01) | |

(52) U.S. Cl.
CPC .............. *G06T 5/50* (2013.01); *G06T 5/20* (2013.01); *G06T 7/13* (2017.01); *G06T 7/136* (2017.01); *G06T 2207/10116* (2013.01); *G06T 2207/20041* (2013.01); *G06T 2207/20221* (2013.01); *G06T 2207/30008* (2013.01)

(58) Field of Classification Search
USPC ........................................... 382/132
See application file for complete search history.

(56) References Cited

U.S. PATENT DOCUMENTS

| | | | |
|---|---|---|---|
| 9,269,139 B2 | 2/2016 | Huo et al. | |
| 2009/0214099 A1* | 8/2009 | Merlet | G06T 7/11 |
| | | | 382/275 |
| 2012/0257810 A1 | 10/2012 | Berg et al. | |
| 2017/0270640 A1* | 9/2017 | Zhang | G06T 5/77 |
| 2020/0167930 A1* | 5/2020 | Wang | G06N 3/08 |

FOREIGN PATENT DOCUMENTS

| | | | |
|---|---|---|---|
| KR | 10-2019-0143708 A | 12/2019 | |
| WO | WO-2015157067 A1 * | 10/2015 | ........... A61B 6/5211 |

* cited by examiner

*Primary Examiner* — Jacky X Zheng
(74) *Attorney, Agent, or Firm* — Rabin & Berdo, P.C.

(57) ABSTRACT

Provided is a method for bone suppression in an X-ray image, which includes: extracting an upper contour line and a lower contour line corresponding to a bone to be suppressed from the original X-ray image; generating a first binarization image and a second binarization image based on the upper contour line and the lower contour line, respectively; generating a first distance transform image and a second distance transform image from the first binarization image and the second binarization image, respectively through distance transform; generating a compensated first X-ray image and a compensated second X-ray image by compensating a pixel value of a region which belongs to the bone by using the first distance transform image and the second distance transform image, respectively from the original X-ray image; and synthesizing the compensated first X-ray image and the compensated second X-ray image to obtain a bone-suppressed X-ray image.

18 Claims, 14 Drawing Sheets

FIG. 7A

|  | $K_{0,0}$ | $K_{0,1}$ | $K_{0,2}$ | $K_{0,3}$ | $K_{0,4}$ | $K_{0,5}$ | $K_{0,6}$ | $K_{0,7}$ | $K_{0,8}$ | $K_{0,9}$ |
|---|---|---|---|---|---|---|---|---|---|---|
| $K_0$ | | | | | | | | | | |
| $K_1$ | $K_{1,0}$ | $K_{1,1}$ | $K_{1,2}$ | $K_{1,3}$ | $K_{1,4}$ | $K_{1,5}$ | $K_{1,6}$ | $K_{1,7}$ | $K_{1,8}$ | $K_{1,9}$ |
| $K_2$ | $K_{2,0}$ | $K_{2,1}$ | $K_{2,2}$ | $K_{2,3}$ | $K_{2,4}$ | $K_{2,5}$ | $K_{2,6}$ | $K_{2,7}$ | $K_{2,8}$ | $K_{2,9}$ |
| $K_3$ | $K_{3,0}$ | $K_{3,1}$ | $K_{3,2}$ | $K_{3,3}$ | $K_{3,4}$ | $K_{3,5}$ | $K_{3,6}$ | $K_{3,7}$ | $K_{3,8}$ | $K_{3,9}$ |
| $K_4$ | $K_{4,0}$ | $K_{4,1}$ | $K_{4,2}$ | $K_{4,3}$ | $K_{4,4}$ | $K_{4,5}$ | $K_{4,6}$ | $K_{4,7}$ | $K_{4,8}$ | $K_{4,9}$ |
| $K_5$ | $K_{5,0}$ | $K_{5,1}$ | $K_{5,2}$ | $K_{5,3}$ | $K_{5,4}$ | $K_{5,5}$ | $K_{5,6}$ | $K_{5,7}$ | $K_{5,8}$ | $K_{5,9}$ |

| $A_0$ | $A_{0,0}$ | $A_{0,1}$ | $A_{0,2}$ | $A_{0,3}$ | $A_{0,4}$ | $A_{0,5}$ | $A_{0,6}$ | $A_{0,7}$ | $A_{0,8}$ | $A_{0,9}$ |
|---|---|---|---|---|---|---|---|---|---|---|
| $A_1$ | $A_{1,0}$ | $A_{1,1}$ | $A_{1,2}$ | $A_{1,3}$ | $A_{1,4}$ | $A_{1,5}$ | $A_{1,6}$ | $A_{1,7}$ | $A_{1,8}$ | $A_{1,9}$ |
| $A_2$ | $A_{2,0}$ | $A_{2,1}$ | $A_{2,2}$ | $A_{2,3}$ | $A_{2,4}$ | $A_{2,5}$ | $A_{2,6}$ | $A_{2,7}$ | $A_{2,8}$ | $A_{2,9}$ |
| $K_0$ | $K_{0,0}$ | $K_{0,1}$ | $K_{0,2}$ | $K_{0,3}$ | $K_{0,4}$ | $K_{0,5}$ | $K_{0,6}$ | $K_{0,7}$ | $K_{0,8}$ | $K_{0,9}$ |
| $K_1$ | $K_{1,0}$ | $K_{1,1}$ | $K_{1,2}$ | $K_{1,3}$ | $K_{1,4}$ | $K_{1,5}$ | $K_{1,6}$ | $K_{1,7}$ | $K_{1,8}$ | $K_{1,9}$ |
| $K_2$ | $K_{2,0}$ | $K_{2,1}$ | $K_{2,2}$ | $K_{2,3}$ | $K_{2,4}$ | $K_{2,5}$ | $K_{2,6}$ | $K_{2,7}$ | $K_{2,8}$ | $K_{2,9}$ |

FIG. 7D

| | $A_{0,0}$ | $A_{0,1}$ | $A_{0,2}$ | $A_{0,3}$ | $A_{0,4}$ | $A_{0,5}$ | $A_{0,6}$ | $A_{0,7}$ | $A_{0,8}$ | $A_{0,9}$ |
|---|---|---|---|---|---|---|---|---|---|---|
| $A_0$ | $A_{0,0}$ | $A_{0,1}$ | $A_{0,2}$ | $A_{0,3}$ | $A_{0,4}$ | $A_{0,5}$ | $A_{0,6}$ | $A_{0,7}$ | $A_{0,8}$ | $A_{0,9}$ |
| $A_1$ | $A_{1,0}$ | $A_{1,1}$ | $A_{1,2}$ | $A_{1,3}$ | $A_{1,4}$ | $A_{1,5}$ | $A_{1,6}$ | $A_{1,7}$ | $A_{1,8}$ | $A_{1,9}$ |
| $A_2$ | $A_{2,0}$ | $A_{2,1}$ | $A_{2,2}$ | $A_{2,3}$ | $A_{2,4}$ | $A_{2,5}$ | $A_{2,6}$ | $A_{2,7}$ | $A_{2,8}$ | $A_{2,9}$ |
| $A_3$ ⇧ | $A_{3,0}$ | $A_{3,1}$ | $A_{3,2}$ | $A_{3,3}$ | $A_{3,4}$ | $A_{3,5}$ | $A_{3,6}$ | $A_{3,7}$ | $A_{3,8}$ | $A_{3,9}$ |
| $K_1$ | $K_{1,0}$ | $K_{1,1}$ | $K_{1,2}$ | $K_{1,3}$ | $K_{1,4}$ | $K_{1,5}$ | $K_{1,6}$ | $K_{1,7}$ | $K_{1,8}$ | $K_{1,9}$ |
| $K_5$ | $K_{5,0}$ | $K_{5,1}$ | $K_{5,2}$ | $K_{5,3}$ | $K_{5,4}$ | $K_{5,5}$ | $K_{5,6}$ | $K_{5,7}$ | $K_{5,8}$ | $K_{5,9}$ |

FIG. 8

| | $A_0$ | $K_1$ |
|---|---|---|
| B1 | $A_{0,0}$ | $K_{1,0}$ |
| | $A_{0,1}$ | $K_{1,1}$ |
| | $A_{0,2}$ | $K_{1,2}$ |
| | $A_{0,3}$ | $K_{1,3}$ |
| | $A_{0,4}$ | $K_{1,4}$ |
| B5 | $A_{0,5}$ | $K_{1,5}$ |
| | $A_{0,6}$ | $K_{1,6}$ |
| | $A_{0,7}$ | $K_{1,7}$ |
| B8 | $A_{0,8}$ | $K_{1,8}$ |
| | $A_{0,9}$ | $K_{1,9}$ |

METHOD AND APPARATUS FOR BONE SUPPRESSION IN X-RAY IMAGE

CROSS-REFERENCE TO RELATED APPLICATIONS

This application claims priority to and the benefit of Korean Patent Application No. 10-2021-0031914 filed in the Korean Intellectual Property Office on Mar. 11, 2021, the entire contents of which are incorporated herein by reference.

TECHNICAL FIELD

The present invention relates to a method and an apparatus for bone suppression in an x-ray image, and more particularly, to a method and an apparatus for bone suppression, which are capable of acquiring an X-ray image in which a bone is suppressed by compensating a single photographed X-ray image.

BACKGROUND ART

As a method for reducing an influence of a bone in order to increase a lesion detection rate in a chest X-ray (CXR) photographing image, there is a technique using a dual energy X-ray (DXR). In the DXR technique, by using a point that X-rays having different energy show a difference in attenuation degree in tissue and bone, X-ray images are photographed twice for the same portion with different energy to acquire an image in which the bone is suppressed. However, in the DXR technique, since the X-ray image should be photographed twice, an exposure amount of radiation to an examinee is large and since two images are photographed at different times, there are various problems including occurrence of an artifact due to movement of an involuntary muscle in the body such as the heart.

SUMMARY OF THE INVENTION

The present invention has been made in an effort to provide a method and an apparatus for bone suppression, which are capable of acquiring an X-ray image in which a bone is suppressed by compensating a single photographed X-ray image.

An exemplary embodiment of the present invention provides a method for bone suppression in an X-ray image, which includes: (a) extracting an upper contour line and a lower contour line corresponding to a bone to be suppressed from the original X-ray image; (b) generating a first binarization image and a second binarization image based on the upper contour line and the lower contour line, respectively; (c) generating a first distance transform image and a second distance transform image from the first binarization image and the second binarization image, respectively through distance transform; (d) generating a compensated first X-ray image and a compensated second X-ray image by compensating a pixel value of a region which belongs to the bone by using the first distance transform image and the second distance transform image, respectively from the original X-ray image; and (e) synthesizing the compensated first X-ray image and the compensated second X-ray image to obtain a bone-suppressed X-ray image.

Step (d) above may include (d1) generating a first coordinate transformed image and a second coordinate transformed image through coordinate system transform by using the first distance transform image and the second distance transform image, respectively from the original X-ray image, (d2) generating a compensated first coordinate transformed image and a compensated second coordinate transformed image by compensating the pixel value of the region which belongs to the bone in the first coordinate transformed image and the second coordinate transformed image, respectively, and (d3) generating the compensated first X-ray image and the compensated second X-ray image from the compensated first coordinate transformed image and the compensated second coordinate transformed image, respectively through coordinate system inverse transform.

In step (d2) above, a pixel value may be compensated per at least one row in a corresponding coordinate transformed image.

In step (d2) above, a pixel value of a corresponding row may be compensated by using pixel values of a compensated row and a row to be compensated, which is adjacent thereto.

In step (d2) above, with respect to a pixel to be compensated, multiple blocks having a predetermined size may be set, which belong to the compensated row and the row to be compensated, and have the corresponding pixel and with respect to each block, a difference between an average of the pixel value of the compensated row and an average of the pixel value of the row to be compensated may be calculated, and the pixel value of the corresponding pixel may be compensated by using an average of the differences of the multiple blocks.

In calculating the average of the differences of the multiple blocks, a weight may be granted for each block.

The weight may be determined according to a distribution a difference in pixel value between the compensated pixel and the pixel to be compensated for each column in the corresponding block.

In calculating the average of the pixel value of the compensated row and the average of the pixel value of the row to be compensated, the weight may be granted for each pixel.

The weight may be determined according to a difference between the average of the pixel value of the row to be compensated in the block and the pixel value of the corresponding pixel.

Another exemplary embodiment of the present invention provides an apparatus for bone suppression in an X-ray image, which includes: a contour line extraction unit extracting an upper contour line and a lower contour line corresponding to a bone to be suppressed from the original X-ray image; a distance transform unit generating a first binarization image and a second binarization image based on the upper contour line and the lower contour line, respectively, and generating a first distance transform image and a second distance transform image from the first binarization image and the second binarization image, respectively through distance transform; an X-ray image compensation unit generating a compensated first X-ray image and a compensated second X-ray image by compensating a pixel value of a region which belongs to the bone by using the first distance transform image and the second distance transform image, respectively from the original X-ray image; and an image synthesis unit synthesizing the compensated first X-ray image and the compensated second X-ray image to obtain a bone-suppressed X-ray image.

The X-ray image compensation unit may include a coordinate system transform unit generating a first coordinate transformed image and a second coordinate transformed image through coordinate system transform by using the first distance transform image and the second distance transform image, respectively from the original X-ray image, an image compensation unit generating a compensated first coordinate transformed image and a compensated second coordinate transformed image by compensating the pixel value of the region which belongs to the bone in the first coordinate transformed image and the second coordinate transformed image, respectively, and a coordinate system inverse transform unit generating the compensated first X-ray image and the compensated second X-ray image from the compensated first coordinate transformed image and the compensated second coordinate transformed image, respectively through coordinate system inverse transform.

The image compensation unit may compensate a pixel value per at least one row in a corresponding coordinate transformed image.

The image compensation unit may compensate a pixel value of a corresponding row by using pixel values of a compensated row and a row to be compensated, which is adjacent thereto.

The image compensation unit may set, with respect to a pixel to be compensated, multiple blocks having a predetermined size, which belong to the compensated row and the row to be compensated, and have the corresponding pixel and calculate, with respect to each block, a difference between an average of the pixel value of the compensated row and an average of the pixel value of the row to be compensated, and compensate the pixel value of the corresponding pixel by using an average of the differences of the multiple blocks.

In calculating the average of the differences of the multiple blocks, a weight may be granted for each block.

The weight may be determined according to a distribution a difference in pixel value between the compensated pixel and the pixel to be compensated for each column in the corresponding block.

In calculating the average of the pixel value of the compensated row and the average of the pixel value of the row to be compensated, the weight may be granted for each pixel.

The weight may be determined according to a difference between the average of the pixel value of the row to be compensated in the block and the pixel value of the corresponding pixel.

According to an exemplary embodiment of the present invention, an X-ray image in which a bone is suppressed by compensating a single photographed X-ray image can be acquired. Accordingly, additional radiation exposure to an examinee is not required and there is no worry about occurrence of artifact due to movement of an involuntary muscle in the body.

A peripheral region of the bone is more substantially reflected by compensating an image based on each of an upper contour line and a lower contour line of the bone to enhance compensation performance.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIGS. 7A to 7D illustrate an example of a process of compensating a pixel value per row in a coordinate transformed image.

FIG. 8 illustrates an example of a block satisfying an assumption that a degree of attenuation due to a bone is equal in a block and a block not satisfying the assumption.

FIG. 9 illustrates an example of a case where a weight is differently granted to a pixel to be compensated for each block.

FIG. 10 illustrates an example of a case where there are large differences between any pixel and other pixels in the block.

Figure 1:
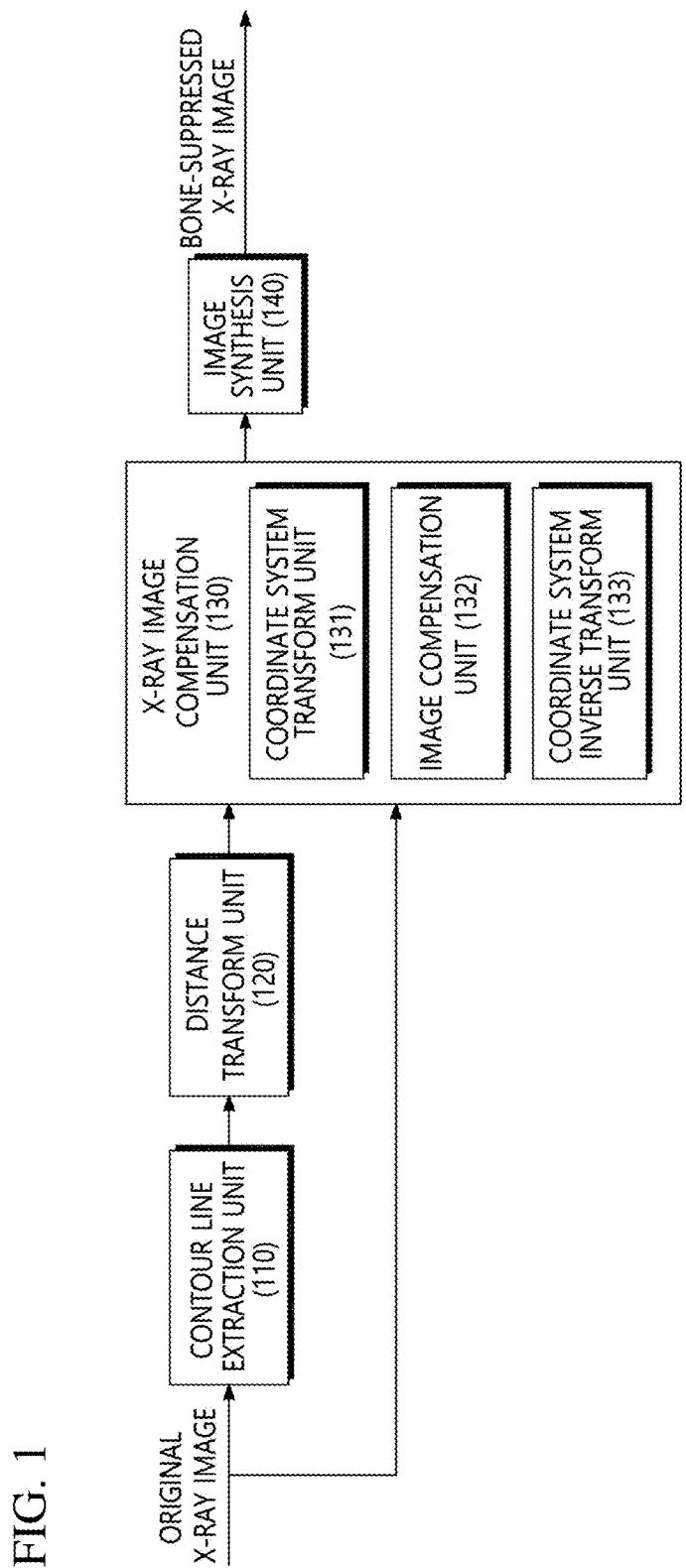
FIG. 1 is a block diagram of an apparatus for bone suppression in an X-ray image according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, preferred embodiments of the present invention will be described in detail with reference to drawings. In the following description and the accompanying drawings, the same components represent the same reference numerals, respectively, and as a result, a duplicated description thereof will be omitted. Further, in describing the present invention, a detailed explanation of a known related function or component may be omitted to avoid unnecessarily obscuring the subject matter of the present invention.

FIG. 1 is a block diagram of an apparatus for bone suppression in an X-ray image according to an exemplary embodiment of the present invention. The apparatus for bone suppression according to the exemplary embodiment may include a contour line extraction unit 110, a distance transform unit 120, an X-ray image compensation unit 130 and an image synthesis unit 140.

A single photographed original X-ray image is input into the contour line extraction unit 110 and the X-ray image compensation unit 130. The original X-ray image as an X-ray image including a bone component and a chest photographed image is described as an example, but may be photographing images of various other portions in addition to a chest.

The contour line extraction unit 110 extracts an upper contour line and a lower contour line corresponding to a bone to be suppressed from the original X-ray image.

The distance transform unit 120 generates a first binarization image and a second binarization image based on the upper contour line and the lower contour line, respectively, and generates a first distance transform image and a second distance transform image through distance transform from the first binarization image and the second binarization image, respectively.

The X-ray image compensation unit 130 generates a compensated first X-ray image and a compensated second X-ray image by compensating a pixel value of a region which belongs to the bone by using the first distance transform image and the second distance transform image, respectively from the original X-ray image.

The X-ray image compensation unit 130 may include a coordinate system transform unit 131, an image compensation unit 132, and a coordinate system inversion transform unit 133. The coordinate system transform unit 131 generates a first coordinate transformed image and a second coordinate transformed image through coordinate system transform by using the first distance transform image and the second distance transform image, respectively from the original X-ray image. The image compensation unit 132 generates a compensated first coordinate transformed image and a compensated second coordinate transformed image by compensating the pixel value of the region which belongs to the bone in the first coordinate transformed image and the second coordinate transformed image, respectively. The coordinate system inversion transform unit 133 generates a compensated first X-ray image and a compensated second X-ray image through coordinate system inverse transform corresponding to the coordinate system transform of the coordinate system transform unit 131 from the compensated first coordinate transformed image and the compensated second coordinate transformed image, respectively.

The image synthesis unit 140 synthesizes the compensated first X-ray image and the compensated second X-ray image to acquire a bone-suppressed X-ray image.

Figure 2:
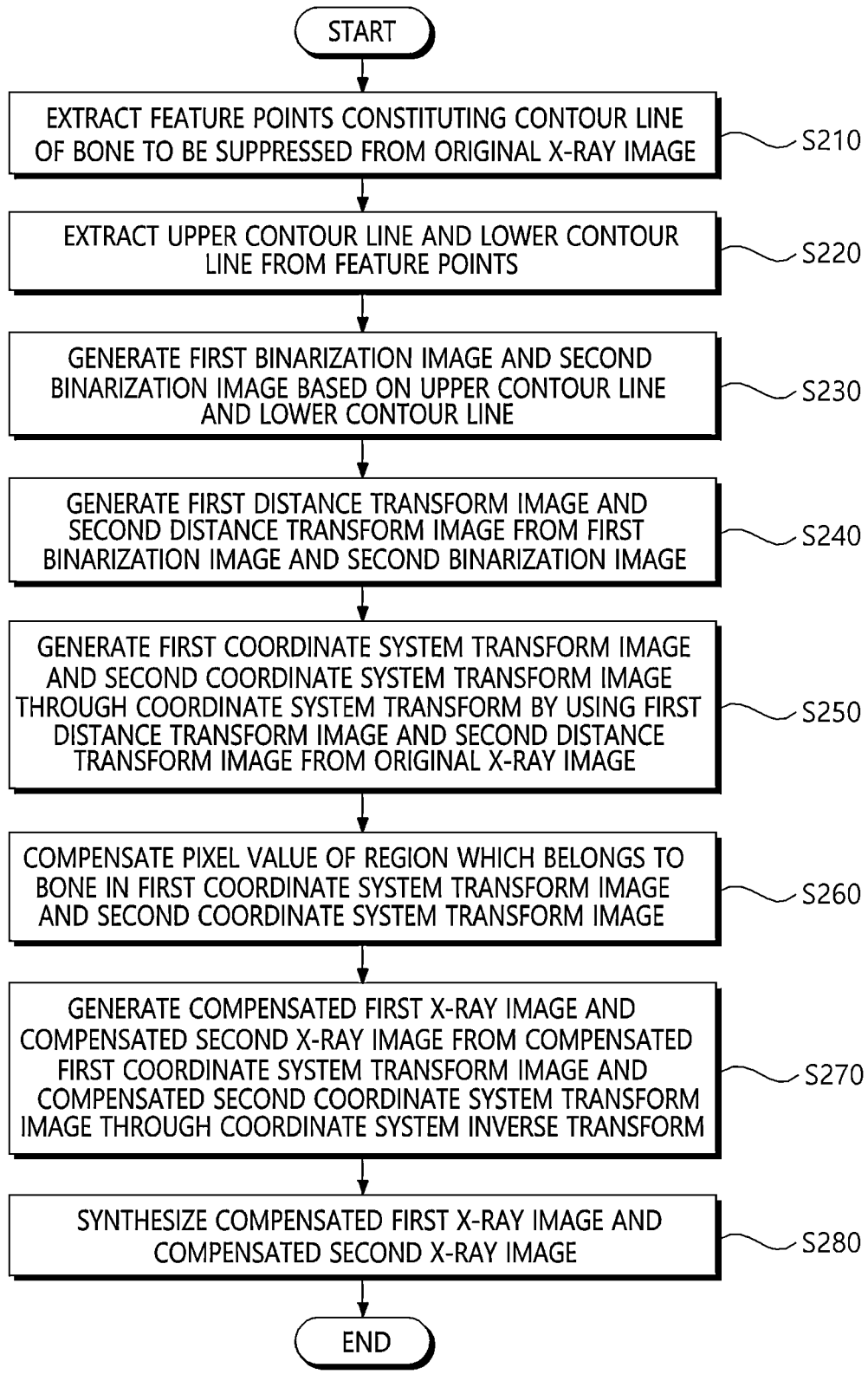
FIG. 2 is a flowchart of a method for bone suppression in an X-ray image according to an exemplary embodiment of the present invention.

FIG. 2 is a flowchart of a method for bone suppression in an X-ray image according to an exemplary embodiment of the present invention. Hereinafter, jointly referring to FIG. 2, an operation of the apparatus for bone suppression according to FIG. 1 will be described in more detail.

In step 210, the contour line extraction unit 110 extracts feature points constituting a contour line of the bone to be suppressed from the original X-ray image.

Figure 3:
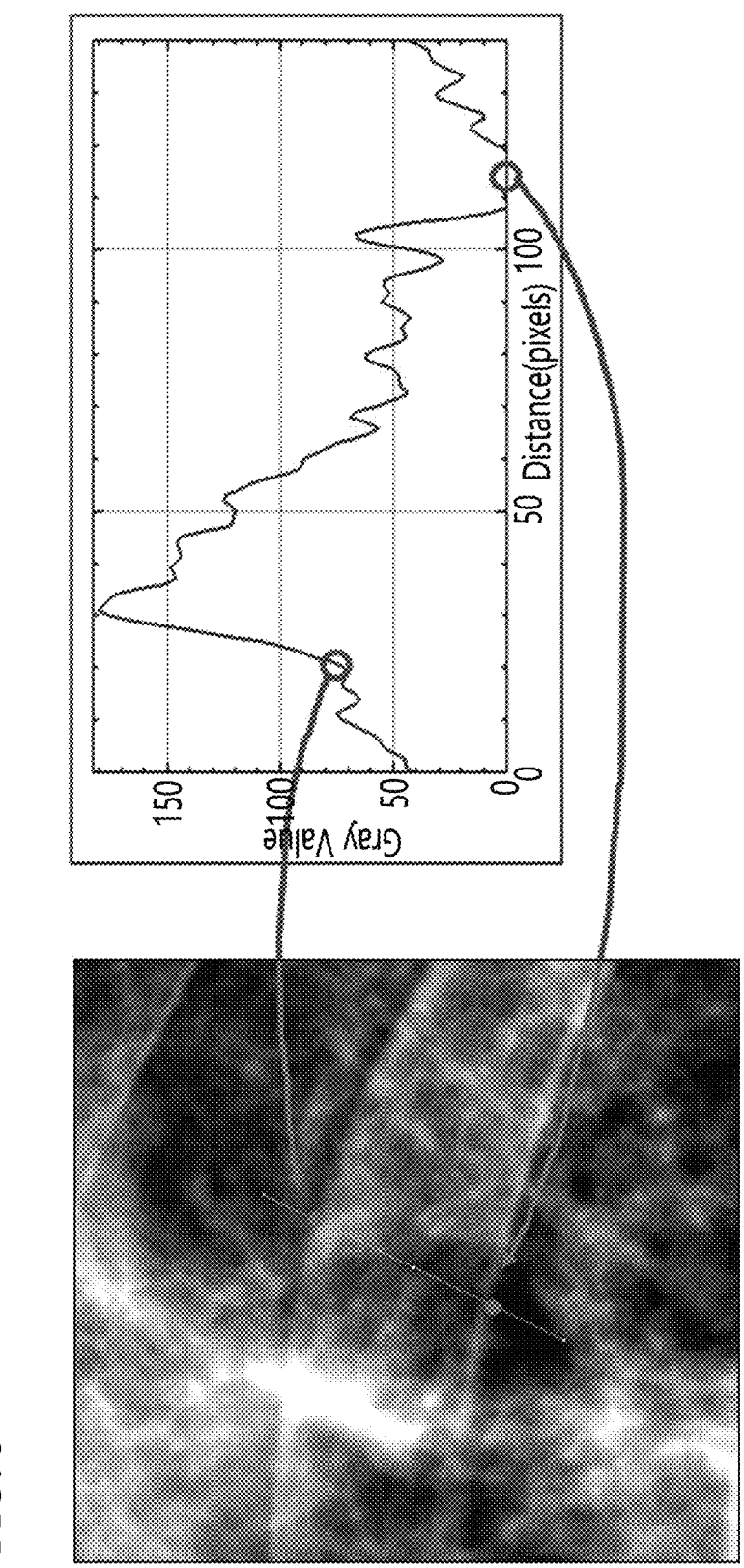
FIG. 3 illustrates an example of gradient based feature point extraction.
Figure 4:
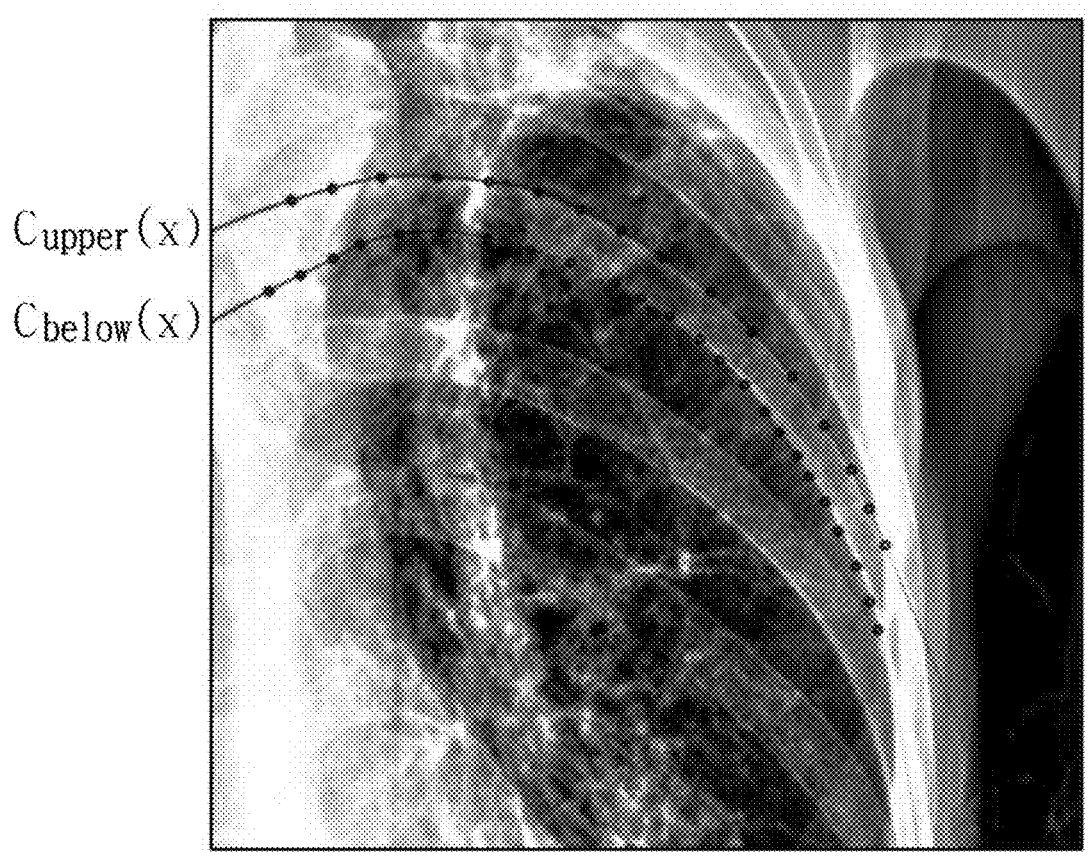
FIG. 4 illustrates an example of a state in which feature points, and an upper contour line and a lower contour line are extracted from an original X-ray image.
Figure 5:
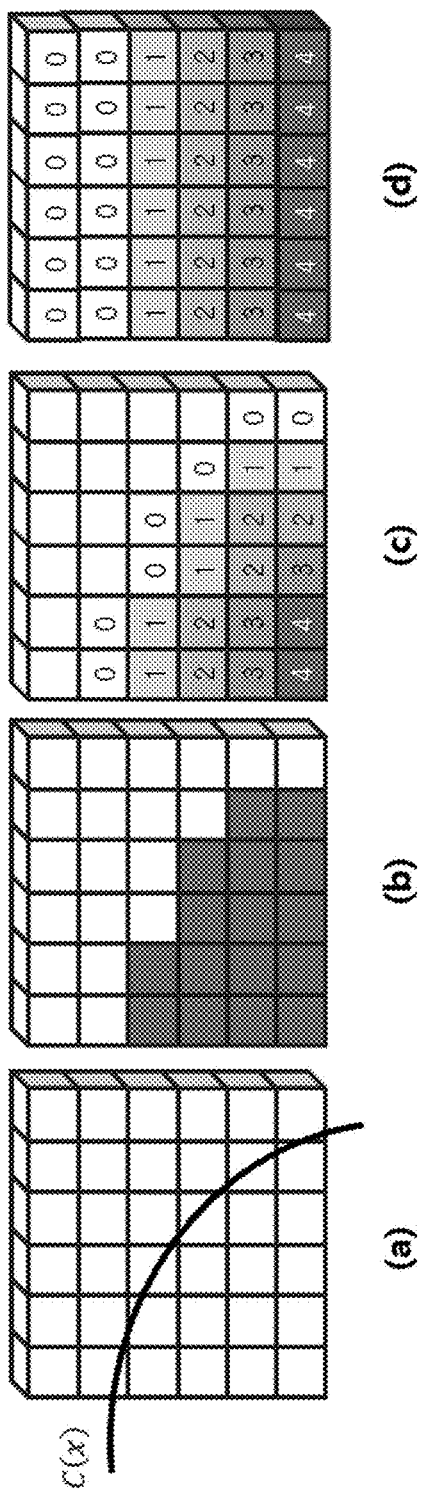
FIG. 5 is a diagram conceptually illustrating a contour line, a binarization image, a distance transform image, and a coordinate transformed image.

The feature points as points which are positioned between the bone to be suppressed and a background as illustrated in FIG. 4 may be extracted by using features in the image. For the extraction of the feature points, various methods including a gradient based method, a method using an artificial intelligence algorithm, a Scale Invariant Feature Transform (SIFT) algorithm, and the like may be used. FIG. 3 illustrates an example of gradient based feature point extraction. As illustrated in FIG. 3, a pixel in which a gradient of a pixel value is rapidly changed among pixels which are on a straight line crossing the bone to be suppressed may be extracted as the feature points.

In step 220, the contour line extraction unit 110 extracts an upper contour line and a lower contour line corresponding to a bone to be suppressed from the feature points. For forming the contour line, various methods including a least squares method, a method for fitting with a single polynomial function by an algorithm Random Sample Consensus (RANSAC), a method for fitting for each section by using a plurality of polynomial functions, and the like may be used.

The method for fitting for each section by using the polynomial function is described below as an example. This method is a method in which multiple polynomial functions are fitted for each section and results of the respective functions are mixed for each section. When it is assumed that the contour line is extracted by fitting multiple 2-dimensional (D) polynomial functions constituted by k feature points from extracted n feature points S(x,y), each 2D polynomial function P(x) satisfies the following equation.

$$P(x) = ax^2 + bx + c \qquad \text{[Equation 1]}$$

$$\operatorname*{argmin}_{a,b,c} \sum\nolimits_{k=1}^{k} \left(S_{i,y} - \left(aS_{i,x}^2 + bS_{i,x} + c\right)\right)^2$$

A final contour line c(x) may be determined from multiple polynomial functions P(x) through the following equation.

$$C(x) = \alpha P_i(x) + \beta P_{i+1}(x)(S_{i,x} \leq x \leq S_{i+1,x}) \qquad \text{[Equation 2]}$$

Here, α and β are weights determined from as in the following equation.

$$\alpha = \frac{S_{i+1,x} - x}{S_{i+1,x} - S_{i,x}} \qquad \text{[Equation 3]}$$

$$\beta = \frac{x - S_{i,x}}{S_{i+1,x} - S_{i,x}}$$

FIG. 4 illustrates an example of features points and a state in which an upper contour line and a lower contour line are extracted from the feature points in an original X-ray image. As illustrated, a smoothly seamless contour line may be formed by using the extracted feature points. Hereinafter, the upper contour line and the lower contour lines will be referred to as $C_{upper}(x)$ and $C_{below}(x)$ respectively.

In step 230, the distance transform unit 120 generates the first binarization image and the second binarization image based on the upper contour line and the lower contour line, respectively. The binarization image is an image in which a foreground is expressed as white and a background is expressed as black with the contour line as a boundary. In the exemplary embodiment, it is assumed that a portion to which the bone to be suppressed is the foreground and a portion other than the bone is the background. In the first binarization image generated based on the upper contour line, an upper side of the upper contour line is expressed as black and a lower side of the upper contour line is expressed as white. In the second binarization image generated based on the lower contour line, the upper side of the lower contour line is expressed as white and the lower side of the lower contour line is expressed as black. Hereinafter, the first binarization image and the second binarization image will be referred to as $B_{upper}$ and $B_{below}$ respectively.

In step 240, the distance transform unit 120 generates the first distance transform image and the second distance transform image from the first binarization image and the second binarization image, respectively through a distance transform.

The distance transform as one of image transform techniques performed for the binarization image is a transform which allows pixels which belong to the foreground to represent a distance from the pixel which belongs to the background when there is the binarization image in which the foreground is expressed as white and the background is expressed as black. Through the distance transform, a peripheral portion of the bone has a comparatively low distance value and a central portion of the bone has a comparatively high distance value. Referring to FIGS. 5, 5A, 5B, and 5C conceptually illustrate the extracted contour line, the binarization image generated based on the contour line, and the distance transform image generated from the binarization image, respectively. Hereinafter, the first distance transform image and the second distance transform image will be referred to as $D_{upper}$ and $D_{below}$, respectively.

In step 250, the coordinate system transform unit 131 generates a first coordinate transformed image and a second coordinate transformed image through coordinate system transform by using the first distance transform image and the second distance transform image, respectively from the original X-ray image.

The coordinate system transform is for transforming into a coordinate system suitable for image compensation to be described below, and coordinate system transform using the distance transform image may be expressed as in the following equation.

$$T:(x,y) \rightarrow (s,d)$$ [Equation 4]

Figure 6:
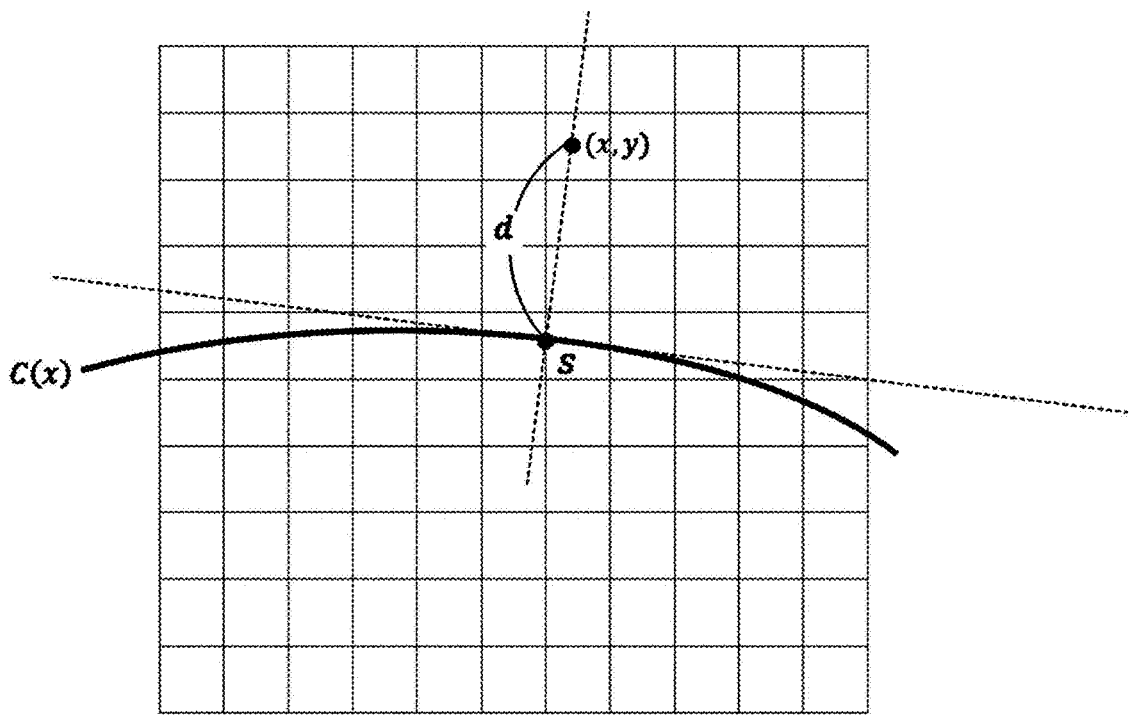
FIG. 6 is a diagram for describing a concept of coordinate system transform.

That is, the coordinate system transform T transforms a coordinate system (x,y) of an original image (original X-ray image) into a coordinate system (s,d). Here, s means one point on the contour line C positioned on a distance closest to one point (x,y) in the original image, and d means a distance up to from one point (x,y) in the original image. In this case, a value of d may be obtained from the distance transform image. FIG. 6 is a diagram for describing a concept of the coordinate system transform. Through the coordinate system transform, a coordinate transformed image K may be obtained from an original image I. Pixels of the coordinate transformed image K may have pixel values of the original image I, and this may be expressed as the following equation.

$$K(T(x,y))=I(x,y)$$ [Equation 5]

FIG. 5(d) conceptually illustrates the coordinate transformed image K obtained by using the distance transform image. The pixels of the coordinate transformed image K have pixel values of the corresponding pixels of the original image I, but in FIG. 5(d), a distance value of a corresponding pixel of the distance transform image is represented in each pixel to help understand thereof.

Through step 250, the first coordinate transformed image $K_{upper}$ is generated from the original X-ray image through the coordinate system transform using the first distance transform image $D_{upper}$ and the second coordinate transformed image $K_{below}$ is generated from the original X-ray image through the coordinate system transform using the second distance transform image $D_{below}$. Accordingly, the first coordinate transformed image $K_{upper}$ corresponds to an upper contour line $C_{upper}(x)$ and the second coordinate transformed image $K_{below}$ corresponds to a lower contour line $C_{below}(x)$.

In step 260, the image compensation unit 132 generates a compensated first coordinate transformed image and a compensated second coordinate transformed image by compensating the pixel value of the region which belongs to the bone in the first coordinate transformed image and the second coordinate transformed image, respectively. Hereinafter, the first coordinate transformed image $K_{upper}$ and the second coordinate transformed image $K_{below}$ will be collectively referred to as the coordinate transformed image K, and described.

It may be assumed that since attenuation due to the bone from the X-ray image becomes stronger toward the center from the periphery of the bone, the attenuation is changed along each row in the coordinate transformed image. In the exemplary embodiment, by using the assumption, compensating a pixel value of a row where attenuation occurs adjacent to a row (or a compensated row) where the attenuation due to the bone does not occur according to an attenuation degree is performed per row in the coordinate transformed image. Accordingly, the image compensation unit 132 compensates the pixel value per row in the coordinate transformed image, but the pixel value of the corresponding row is compensated by using the pixel values of the row (or the compensated row) where the attenuation does not occur and a row to be compensated, which is adjacent thereto. In the exemplary embodiment of the present invention, it is described as an example that the pixel value is compensated per single row, but in some exemplary embodiments, the pixel value may also be compensated per multiple rows.

Figure 7B:
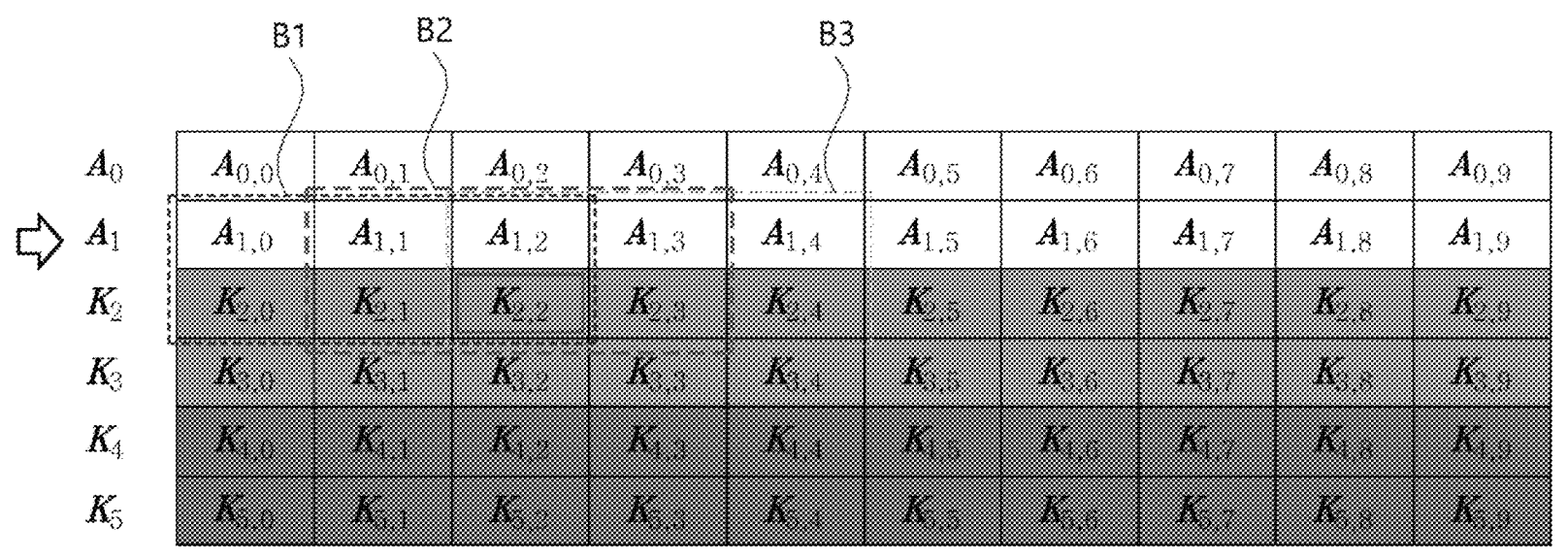

FIGS. 7A to 7D illustrate an example of a process of compensating a pixel value per row in a coordinate transformed image. In FIG. 7A, a row $K_0$ corresponds to a region (background region) where the attenuation due to the bone does not occur and the remaining rows $K_1$, $K_2$, $K_3$, $K_4$, . . . correspond to a region (foreground region) where the attenuation due to the bone occurs. A process of sequentially compensating the remaining rows $K_1$, $K_2$, $K_3$, $K_4$, . . . from the row $K_0$ may be expressed as in the following equation.

$$A_0=K_0$$

$$A_n=f(A_{n-1},K_n)$$ [Equation 6]

Here, A means the compensated row, a subscript 0, 1, . . . , n−1, n means an index of the row, and $f$ means a function of performing the compensation. That is, $A_{n-1}$ means a row which does not have the attenuation or is compensated, $K_n$ means a row to be compensated, which is adjacent to $A_{n-1}$, and $A_n$ means a row compensated for $K_n$. Equation 6 expresses that it is repeated that the row $K_1$ is compensated based on the row $K_0$ where the attenuation due to the bone does not occur, and then a next row to the compensated row is compensated.

Referring to FIGS. 7A and 7B, the pixel value of the row $K_1$ is compensated to $A_1$ by using the pixel values of the row $A_0=K_0$ where the attenuation due to the bone does not occur and the row $K_1$ to be compensated, which is adjacent thereto ($A_1=f(A_0,K_1)$).

Referring to FIGS. 7B and 7C, the pixel value of the row $K_2$ is compensated to $A_2$ by using the pixel values of the compensated row $A_1$ and the row $K_2$ to be compensated, which is adjacent thereto ($A_2=f(A_1,K_2)$).

Referring to FIGS. 7C and 7D, the pixel value of the row $K_3$ is compensated to $A_1$ by using the pixel values of the compensated row $A_2$ and the row $K_3$ to be compensated, which is adjacent thereto ($A_3=f(A_2,K_3)$).

A specific example of the function $f$ of performing the compensation is described as below. The image compensation unit 132 sets multiple blocks having a predetermined size, which belong to the compensated row (or the row where the attenuation does not occur) and the row to be compensated, and include the corresponding pixel, with respect to a pixel to be compensated, in order to remove an attenuation component due to the bone from the pixel value of the row where the attenuation occurs. In addition, a difference between an average of the pixel values of the compensated rows and an average of the pixel values of the row to be compensated in the respective blocks is calculated, and an average of the difference of the multiple blocks is added to the pixel value of the corresponding pixel to compensate the pixel value.

In this case, $A_n=f(A_{n-1},K_n)$ of Equation 6 may be expressed as in the following equation.

$$A_{n,x} = K_{n,x} + \frac{\sum_{k=x-\frac{w}{2}}^{x+\frac{w}{2}} \sum_{j=k-\frac{w}{2}}^{k+\frac{w}{2}} (A_{n-1,j} - K_{n,j})}{w^2} \quad \text{[Equation 7]}$$

Here, W means a width of the block, n means an index of the row, and x means an index of a column.

The above contents will be described with an example as follows with reference to FIG. 7B. Referring to FIG. 7B, it is assumed that the compensated row $A_1$, is the row to be compensated is $K_2$, and the pixel to be compensated is $K_{2,2}$. B1, B2, and B3 which are blocks having a width of 3 are set, which belong to the row $A_1$ and the row $K_2$ and include the pixel $K_{2,2}$. With respect to block B1, a difference between an average of $A_{1,0}$, $A_{1,1}$, and $A_{1,2}$ and an average of $K_{2,0}$, $K_{2,1}$, and $K_{2,2}$ is calculated, with respect to block B2, a difference between an average of $A_{1,1}$, $A_{1,2}$, and $A_{1,3}$ and an average of $K_{2,1}$, $K_{2,2}$, and $K_{2,3}$ is calculated, and with respect to block B3, a difference between an average of $A_{1,2}$, $A_{1,3}$, and $A_{1,4}$ and an average of $K_{2,2}$, $K_{2,3}$, and $K_{2,4}$ is calculated. In addition, a value acquired by adding an average of the difference calculated with respect to the blocks B1, B2, and B3 to $K_{2,2}$ becomes $A_{2,2}$ of FIG. 7C.

Through step 260, a compensation first coordinate transformed image $A_{upper}$ and a compensated second coordinate transformed image $A_{below}$ may be obtained from the first coordinate transformed image $K_{upper}$ and the second coordinate transformed image $K_{below}$, respectively.

In step 270, the coordinate system inversion transform unit 133 generates a compensated first X-ray image and a compensated second X-ray image through coordinate system inverse transform corresponding to the coordinate transformed image in step 250 above from the compensated first coordinate transformed image and the compensated second coordinate transformed image, respectively.

In step 280, the image synthesis unit 140 synthesizes the compensated first X-ray image and the compensated second X-ray image to obtain the bone-suppressed X-ray image. The compensated first X-ray image is an image in which the compensation is performed based on the upper contour line of the bone and the compensated second X-ray image corresponds to an image in which the compensation is performed based on the lower contour line of the bone. Accordingly, the compensated first X-ray image and the compensated second X-ray image, a boundary between a region where the compensation is performed and a region where the compensation is not performed may be remarkably shown. In order to remove an unnatural boundary line, a natural image may be obtained by using an image blending technique such as an alpha blending or Poisson image blending technique.

The bone-suppressed X-ray image may be obtained without a problem as a whole through the exemplary embodiment of the present invention, but compensation performance may also deteriorate partially around a spine or a region where the pixel value shows a large difference from a surrounding like a case where other materials are jointly photographed. Hereinafter, in order to improve such a problem, modified exemplary embodiments of a process of compensating the pixel value will be described.

First, the process of compensating the pixel value in step 260 above is based on an assumption that the degree of the attenuation due to the bone is equal in the same block. However, in some cases, a block which does not satisfy the assumption may be present in the image. FIG. 8 illustrates an example of a block satisfying an assumption that a degree of attenuation due to a bone is similar in a block and a block not satisfying the assumption. Referring to FIG. 8, when it is assumed that there is a difference in pixel value between a white shade region and a gray shade region, blocks B1 and B8 satisfy that the assumption that the attenuation due to the bone is equal in the block, but block B5 does not satisfy the assumption (that is to say, a boundary portion of the spine). Accordingly, when the value calculated for each block is averaged with the same weight upon compensating the pixel value, artifact may occur in the compensated image due to the block which does not satisfy the assumption. In order to improve such a problem, when the difference between the average of the pixel value of the compensated row and the average of the pixel value of the row to be compensated in each block is calculated, and then the average of the differences of multiple blocks for the pixel value of the corresponding pixel is calculated, the average of the differences of multiple blocks may be calculated by granting a different weight for each block. The weight for each block may be determined according to a distribution (for example, a standard deviation) of a difference in pixel value between a compensated pixel (or pixel where the attenuation does not occur) and a pixel to be compensated for each column in the corresponding block.

The weight $W_{inter}$ for each block may be calculated according to the following equation, for example.

$$S_n = A_{n-1} - K_n \quad \text{[Equation 8]}$$

$$W_{inter\,n,k} = \frac{1}{stddev(S_{n,k})}$$

Here, n means the row to be compensated, $S_n$ represents the difference in pixel value between the compensated pixel (or pixel where the attenuation does not occur) and the pixel to be compensated for each column in the corresponding block, stddev($S_{n,k}$) means a standard deviation of $S_n$ for a k-th block, and $W_{inter\,n,k}$ means a weight of the k-th block. That is, $W_{inter\,n,k}$ represents a reciprocal number of the standard deviation of $S_n$. Accordingly, as the standard deviation of $S_n$ is smaller, a higher weight is granted and as the standard deviation of $S_n$ is larger, a lower weight is granted. Since the corresponding block satisfies the assumption that the attenuation due to the bone is similar in the block as the standard deviation of $S_n$ is smaller, the high weight is granted to the block to obtain a compensated image having small artifact.

Figure 9:
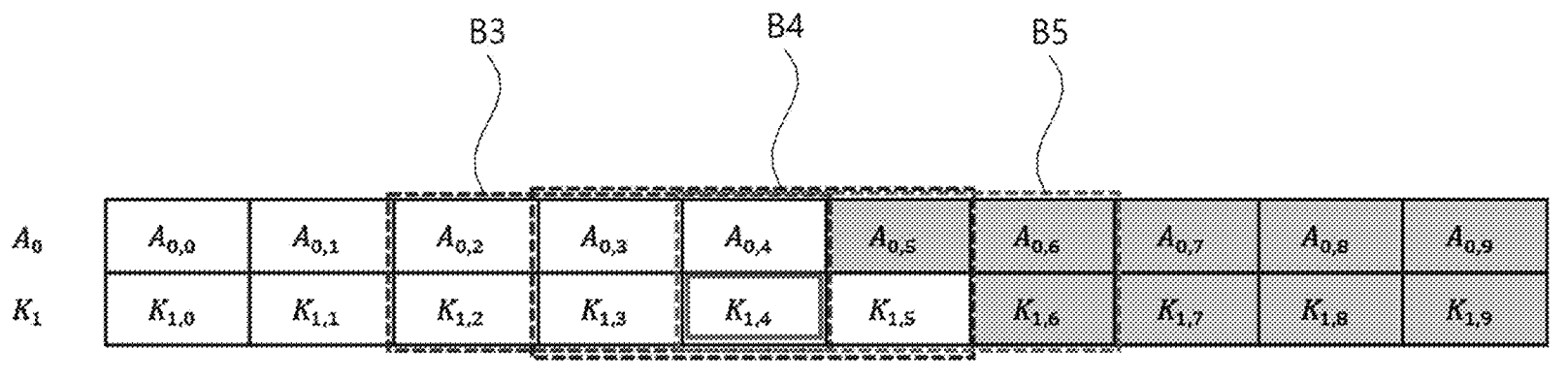

FIG. 9 illustrates an example of a case where a weight is differently granted to a pixel to be compensated for each block. Referring to FIG. 9, when the pixel value of the pixel $K_{1,4}$ is intended to be compensated, blocks B3, B4, and B5 are set. In the case of block B3, $S_n$ has values of $A_{0,2}$-$K_{1,2}$, $A_{0,3}$-$K_{1,3}$, and $A_{0,4}$-$K_{1,4}$, in the case of block B4, $S_n$ has values of $A_{0,3}$-$K_{1,3}$, $A_{0,4}$-$K_{1,4}$, and $A_{0,5\text{-}1}$-$K_{1,5}$, and in the case of block B5, $S_n$ has values of $A_{0,4}$-$K_{1,4}$, $A_{0,5}$-$K_{1,5}$, and $A_{0,6}$-$K_{1,6}$. Accordingly, in the case of block B3, since the standard deviation of is small, the high weight is granted and in the case of blocks B4 and B5, since the standard deviation of $S_n$ is large, the low weight is granted.

Figure 10:
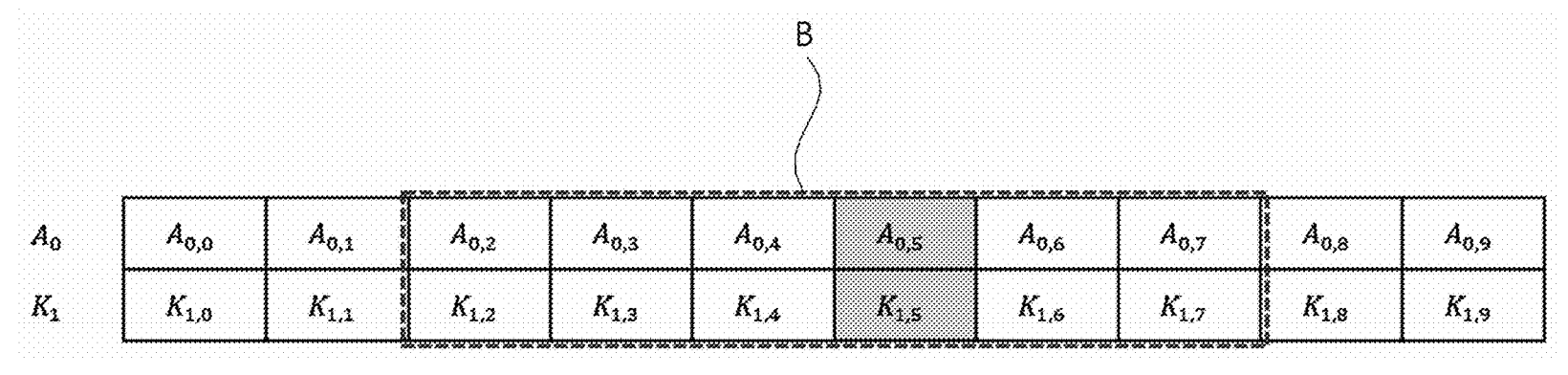

Further, when there is a pixel showing a large difference in pixel value from other portions in the block due to any material, the compensation performance may deteriorate due to such a pixel. FIG. 10 illustrates an example of a case where there are large differences between any pixel and other pixels in the block. Referring to FIG. 10, it can be seen that the pixel value of the pixel $K_{1,5}$ shows a large difference from those of other pixels in the block B. In order to improve such a problem, in calculating the difference between the average of the pixel value of the compensated row and the average of the pixel value of the row to be compensated in the block, the average of the pixel value may be calculated by granting a different weight for each pixel. The weight for each pixel in the block may be determined according to a difference between the average of the pixel value of the row to be compensated in the block and the pixel value of the corresponding pixel. That is to say, a high weight is granted to a pixel having a pixel value close to the average of the pixel value of the row to be compensated and a low weight is granted to a pixel having a pixel value distant from the average of the pixel value of the row to be compensated.

For example, a weight of an $W_{intra\ n,k,j}$ pixel in a k-th block in an n-th row may be calculated according to the equation.

$$W_{intra\ n,k,j} = \frac{2}{e^{a \cdot |K_{n,k,j} - \overline{K}_{n,k}|} + 1} \quad \text{[Equation 9]}$$

Here, a(a>0) represents a parameter for determining a reflection level of the weight, $K_{n,k,j}$ means a pixel value of the j-th pixel in the k-th block of the n-th row, and $\overline{K}_{n,k}$ means the average of the pixel value in k-th the block of the n-th row. Referring to Equation 9, as $K_{n,k,j}$ and $\overline{K}_{n,k}$ are more similar, $W_{intra\ n,k,j}$ has a value close to 1 and as $K_{n,k,j}$ is distant from $\overline{K}_{n,k}$, $W_{intra\ n,k,j}$ has a value close to 0. The low weight is granted to the pixel which shows a large difference from other pixels in the block as such to increase reliability in calculating the difference between the average of the pixel value of the compensated row and the average of the pixel value of the row to be compensated in the block.

When the weight for each block according to Equation 8 and the weight for each pixel in the block according to Equation 9 are reflected to Equation 7 which is a pixel value compensation function, a result thereof may be expressed as in the following equation.

$$A_{n,x} = K_{n,x} + \frac{\sum_{k=x-\frac{w}{2}}^{x+\frac{w}{2}} \left( \sum_{j=k-\frac{w}{2}}^{k+\frac{w}{2}} ((A_{n-1,j} - K_{n,j}) \cdot W_{intra\ n,k,j}) \right) \cdot W_{inter\ n,k}}{\sum_{k=x-\frac{w}{2}}^{x+\frac{w}{2}} \left( \left( \sum_{j=k-\frac{w}{2}}^{k+\frac{w}{2}} W_{intra\ n,k,j} \right) \cdot W_{inter\ n,k} \right)} \quad \text{[Equation 10]}$$

Both the weight for each block and the weight for each pixel in the block are reflected to Equation 10, but in some exemplary embodiments, only the weight for each block may also be reflected and only the weight for each pixel in the block may also be reflected.

Figure 11:
FIG. 11 illustrates an example of a process of acquiring an X-ray image in which a bone is suppressed from an original X-ray image according to an exemplary embodiment of the present invention.
Figure 11:
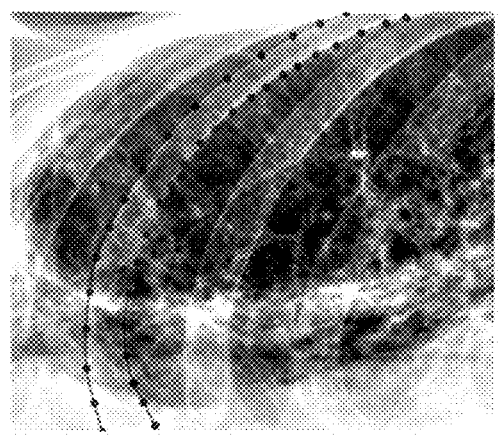
Figure 11:
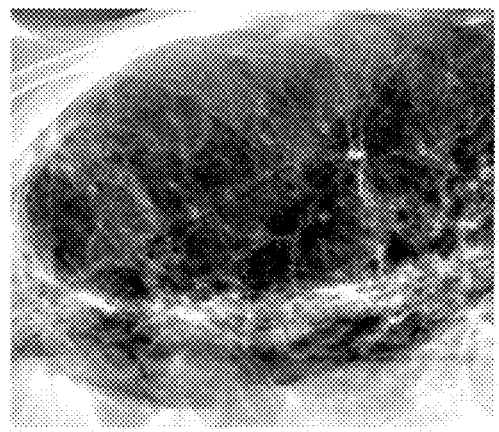

FIG. 11 illustrates an example of a process of acquiring an X-ray image in which a bone is suppressed from an original X-ray image according to an exemplary embodiment of the present invention. Referring to FIG. 11, it can be seen that a contour line (b) is extracted from an original X-ray image (a), and a bone-suppressed X-ray image (c) is obtained through pixel compensation of a region which belongs to the bone.

Meanwhile, the apparatus according to the exemplary embodiments of the present invention may include a processor, a memory storing and executing program data, a permanent storage such as a disk drive, a communication port communicating with an external apparatus, a user interface device such as a touch panel, a key, a button, etc., and the like. Methods implemented by a software module or algorithm as computer-readable codes or program commands executable on the processor may be stored in computer-readable recording media. Here, the computer-readable recording media include magnetic storage media (e.g., a read-only memory (ROM), a random-access memory (RAM), a floppy disk, a hard disk, etc.) and optical reading media (e.g., a CD-ROM, a digital versatile disc (DVD), etc.). The computer-readable recording media may be stored and executed as codes which may be distributed in the computer system connected through a network and read by a computer in a distribution method. The media are readable by a computer, stored in the memory executable by the processor.

The exemplary embodiments of the present invention may be represented by functional block components and various processing steps. The functional blocks may be implemented by various numbers of hardware or/and software components executing specific functions. For example, the exemplary embodiments may adopt integrated circuit components including a memory, processing, logic, a look-up table, etc., which may execute various functions by control by one or more microprocessors or by other control devices. Similarly to a case where the component of the present invention may be executed by software programming or software elements, the exemplary embodiment includes a data structure, processes, routines, or various algorithms implemented by a combination of other programming components to be implemented by a programming or scripting language such as C, C++, Java, assembler, etc. Functional aspects may be implemented by an algorithm executed by one or more processors. Further, the exemplary embodiment may adopt related art for electronic environmental setting, signal processing, and/or data processing. Terminologies such as "mechanism", "element", "means", and "component" may be widely used, and are not limited to mechanical and physical components. The terminologies may mean a meaning of a series of routines of software in link with a processor, etc.

Specific executions described in the exemplary embodiment are exemplary embodiments and the scope of the exemplary embodiment is not limited even by any method. For brevity of the specification, descriptions of conventional electronic configurations, control systems, software, and other functional aspects of the systems may be omitted. Further, connection or connection members of lines among components exemplarily represent functions connections and/or physical or circuitry connections and may be represented as various functional connections, physical connections, or circuitry connections which are replaceable or added in an actual device. Further, unless otherwise specified, such as "essential", "important", etc., the connections may not be components particularly required for application of the present invention.

The present invention has been described above with reference to preferred embodiments thereof. It is understood to those skilled in the art that the present invention may be implemented as a modified form without departing from an essential characteristic of the present invention. Therefore, the disclosed embodiments should be considered in an illustrative viewpoint rather than a restrictive viewpoint. The scope of the present invention is defined by the appended claims rather than by the foregoing description, and all differences within the scope of equivalents thereof should be construed as being included in the present invention.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method for bone suppression in a single photographed X-ray image, the method comprising:
    (a) extracting an upper contour line and a lower contour line corresponding to a bone to be suppressed from an original X-ray image;
    (b) generating a first binarization image and a second binarization image based on the upper contour line and the lower contour line, respectively;
    (c) generating a first distance transform image and a second distance transform image from the first binarization image and the second binarization image, respectively through distance transform;
    (d) generating a compensated first X-ray image and a compensated second X-ray image by compensating a pixel value of a region which belongs to the bone by using the first distance transform image and the second distance transform image, respectively from the original X-ray image; and
    (e) synthesizing the compensated first X-ray image and the compensated second X-ray image to obtain a bone-suppressed X-ray image.

2. The method of claim 1, wherein step (d) includes
    (d1) generating a first coordinate transformed image and a second coordinate transformed image through a coordinate system transform by using the first distance transform image and the second distance transform image, respectively from the original X-ray image,
    (d2) generating a compensated first coordinate transformed image and a compensated second coordinate transformed image by compensating the pixel value of the region which belongs to the bone in the first coordinate transformed image and the second coordinate transformed image, respectively, and
    (d3) generating the compensated first X-ray image and the compensated second X-ray image from the compensated first coordinate transformed image and the compensated second coordinate transformed image, respectively through a coordinate system inverse transform.

3. The method of claim 2, wherein in step (d2), a pixel value is compensated per at least one row in a corresponding coordinate transformed image.

4. The method of claim 3, wherein in step (d2), a pixel value of a corresponding row is compensated by using pixel values of a compensated row and a row to be compensated, which is adjacent thereto.

5. The method of claim 4, wherein in step (d2), with respect to a pixel to be compensated, multiple blocks having a predetermined size are set, which belong to the compensated row and the row to be compensated, and have a corresponding pixel and with respect to each block, a difference between an average of the pixel values of the compensated row and an average of the pixel values of the row to be compensated is calculated, and a pixel value of the corresponding pixel is compensated by using an average of the differences of the multiple blocks.

6. The method of claim 5, wherein in calculating the average of the differences of the multiple blocks, a weight is granted for each block.

7. The method of claim 6, wherein the weight is determined according to a distribution of a difference in pixel value between a compensated pixel and the pixel to be compensated for each column in a corresponding block.

8. The method of claim 5, wherein in calculating the average of the pixel values of the compensated row and the average of the pixel values of the row to be compensated, a weight is granted for each pixel.

9. The method of claim 8, wherein the weight is determined according to a difference between the average of the pixel values of the row to be compensated in the block and the pixel value of the corresponding pixel.

10. An apparatus for bone suppression in a single photographed X-ray image, the apparatus comprising:
    a contour line extraction unit extracting an upper contour line and a lower contour line corresponding to a bone to be suppressed from an original X-ray image;
    a distance transform unit generating a first binarization image and a second binarization image based on the upper contour line and the lower contour line, respectively, and generating a first distance transform image and a second distance transform image from the first binarization image and the second binarization image, respectively through distance transform;
    an X-ray image compensation unit generating a compensated first X-ray image and a compensated second X-ray image by compensating a pixel value of a region which belongs to the bone by using the first distance transform image and the second distance transform image, respectively from the original X-ray image; and
    an image synthesis unit synthesizing the compensated first X-ray image and the compensated second X-ray image to obtain a bone-suppressed X-ray image.

11. The apparatus of claim 10, wherein the X-ray image compensation unit includes
    a coordinate system transform unit generating a first coordinate transformed image and a second coordinate transformed image through a coordinate system transform by using the first distance transform image and the second distance transform image, respectively from the original X-ray image,
    an image compensation unit generating a compensated first coordinate transformed image and a compensated second coordinate transformed image by compensating the pixel value of the region which belongs to the bone in the first coordinate transformed image and the second coordinate transformed image, respectively, and a coordinate system inverse transform unit generating the compensated first X-ray image and the compensated second X-ray image from the compensated first coordinate transformed image and the compensated second coordinate transformed image, respectively through a coordinate system inverse transform.

12. The apparatus of claim 11, wherein the image compensation unit compensates a pixel value per at least one row in a corresponding coordinate transformed image.

13. The apparatus of claim 12, wherein the image compensation unit compensates a pixel value of a corresponding row by using pixel values of a compensated row and a row to be compensated, which is adjacent thereto.

14. The apparatus of claim 13, wherein the image compensation unit sets, with respect to a pixel to be compensated, multiple blocks having a predetermined size, which belong to the compensated row and the row to be compensated, and have a corresponding pixel and calculates, with respect to each block, a difference between an average of the pixel values of the compensated row and an average of the pixel values of the row to be compensated, and compensates a pixel value of the corresponding pixel by using an average of the differences of the multiple blocks.

15. The apparatus of claim 14, wherein in calculating the average of the differences of the multiple blocks, a weight is granted for each block.

16. The apparatus of claim 15, wherein the weight is determined according to a distribution of a difference in pixel value between a compensated pixel and the pixel to be compensated for each column in a corresponding block.

17. The apparatus of claim 14, wherein in calculating the average of the pixel value of the compensated row and the average of the pixel value of the row to be compensated, weight is granted for each pixel.

18. The apparatus of claim 17, wherein the weight is determined according to a difference between the average of the pixel values of the row to be compensated in the block and the pixel value of the corresponding pixel.

* * * * *